United States Patent [19]
Heim et al.

[11] Patent Number: 6,007,133
[45] Date of Patent: Dec. 28, 1999

[54] TAILGATE ARRANGEMENT OF THE BODY OF A MOTOR VEHICLE AND REAR LAMP UNIT

[75] Inventors: Gunther Heim, Waldaschaff; Joachim Janz, Stammham; Armin Klein, Westerngrund, all of Germany

[73] Assignee: Wagon Automotive GmbH, Waldaschaff, Germany

[21] Appl. No.: 09/247,805

[22] Filed: Feb. 11, 1999

[30] Foreign Application Priority Data

Feb. 11, 1998 [DE] Germany .......................... 198 05 337
Mar. 5, 1998 [DE] Germany .......................... 198 09 348

[51] Int. Cl.⁶ .................................................. B62D 25/00
[52] U.S. Cl. ......................... 296/56; 296/146.9; 362/549
[58] Field of Search .................. 296/56, 146.9; 362/496, 549

[56] References Cited

U.S. PATENT DOCUMENTS

| | | | |
|---|---|---|---|
| 4,880,267 | 11/1989 | Ohya | 296/56 |
| 4,994,942 | 2/1991 | Georgeff | 362/549 |
| 5,147,106 | 9/1992 | Bartelt et al. | 296/56 |
| 5,851,049 | 12/1998 | Squire et al. | 296/56 |

FOREIGN PATENT DOCUMENTS 0 256 399  2/1988  European Pat. Off. .
197 02 543  8/1997  Germany .

*Primary Examiner*—Gary C. Hoge
*Attorney, Agent, or Firm*—Sixbey, Friedman Leedom & Ferguson; David S. Safran

[57] ABSTRACT

Tailgate arrangement of a body of a motor vehicle, with a body opening (3), a tailgate (4) which is assigned to the body opening (3) and which closes it, at least one, preferably two rear lamp units (7) assigned to the body opening (3), a peripheral attachment flange (8) being provided bordering the body opening (3) and the attachment flange having a peripheral sealing profile (9), which is optionally composed of several sections, mounted on it for sealing against a sealing flange on the tailgate (4). This tailgate arrangement is simplified in terms of production engineering and installation technique by the edge of the body opening (3) in the area of the rear lamp units (7) being formed by the rear lamp units (7) themselves, specifically the corresponding sections of the attachment flange (8) for the sealing profile (9) being formed on the rear lamp units (7).

21 Claims, 5 Drawing Sheets

TAILGATE ARRANGEMENT OF THE BODY OF A MOTOR VEHICLE AND REAR LAMP UNIT

BACKGROUND OF THE INVENTION

1. Field of the Invention

The invention relates to a tailgate arrangement of the body of a motor vehicle with a body opening, a tailgate for closing the body opening and at least one, preferably two, rear lamp units in proximity to the body opening, a peripheral attachment flange being formed around the body opening and on which a peripheral sealing profile is provided which is optionally composed of several sections and which corresponds to a peripheral sealing flange on the tailgate. Tailgate arrangements of the type to which the invention is directed includes not only tailgates of station wagons and fastbacks, but also, on the one hand, a rear door arrangement, on the other hand, trunk lid arrangements. Thus, for the sake of simplicity, the invention is described below using a station wagon as an example, but it is not intended that it be limited thereto.

2. Description of Related Art

In a motor vehicle body of known construction, the body opening is stiffened by frame structures and the tailgate is coupled to pivot on a transverse flange of the body bordering the opening via hinges. Adjacent to the body opening for the tailgate, there are body openings or body cavities into which the rear lamp units are inserted.

Both the body opening for the tailgate and also the body openings or body cavities for the rear lamp units must be sealed against water. This is done via sealing profiles which optionally run in several tracks in the area of the rear lamp units. But, it is common practice that the sealing profile is located on a peripheral attachment flange bordering the body opening, while the tailgate has a sealing flange which adjoins the sealing profile in the closed state. However, basically, it is also possible to interchange the attachment flange and the sealing flange, and therefore, to apply the peripheral sealing profile in the area of the body opening to the tailgate instead of the body. The latter of course precludes the possibility of integrating the sealing profiles for the rear lamp units with that for the tailgate.

The tailgate arrangement of the body of a motor vehicle on which the invention is specifically based (published German Patent Application DE-A-197 02 543) is made as a tailgate module which has its own peripheral retaining frame and which can be attached to the remainder of the vehicle body. This is intended to enable economical preinstallation with a high degree of integration. In this construction, the retaining frame of the tailgate module itself has metal reinforcing struts which separate receivers for the rear lamp units in the area surrounded by the retaining frame. These metal reinforcing are welded in the retaining frame, and at the same time, form the attachment flange for the sealing profiles, on the one hand, and are welded to the body at the body opening for the tailgate, on the other hand, for the rear lamp unit. Therefore, the metal reinforcing brace has the function of the corresponding formation of the body, or on the body, in those built conventionally without a separate tailgate module.

SUMMARY OF THE INVENTION

The primary object of this invention is to further simplifying the structure of the tailgate arrangement with respect to production engineering and especially installation.

The aforementioned object is achieved by having the edge of the body opening in the area of the rear lamp units be formed by the lamp units themselves. Specifically, the corresponding sections of the attachment flange for the sealing profile are formed on the rear lamp units. Therefore, according to the invention, the rear lamp unit is used as a structural component to form the body opening itself by the rear lamp unit itself forming the attachment flange for the sealing profile in the corresponding section, the sealing profile adjoining the sealing flange of the tailgate to seal it in the closed state.

Fundamentally, the above described concept can be accomplished regardless of whether the tailgate arrangement is integrated in the classical manner into the body of the motor vehicle, or according to the above explained prior art, is accomplished in the form of an independent tailgate module. It is important that the rear lamp unit, in any case, in the area of the attachment flange for the sealing profile, has a corresponding loading capacity and stiffness to be able to accommodate the sealing forces which arise.

As has already been explained above, the concept of the tailgate arrangement should be understood functionally, therefore comprises all other body closures which interact in a similar manner with rear lamp units, like a tailgate Reference has already been made to the reversible assignment of the attachment flange and sealing flange which is relatively unconventional, but technically possible.

The subject of the invention is also a rear lamp unit as a commercial part in which the teaching of the invention is accomplished.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
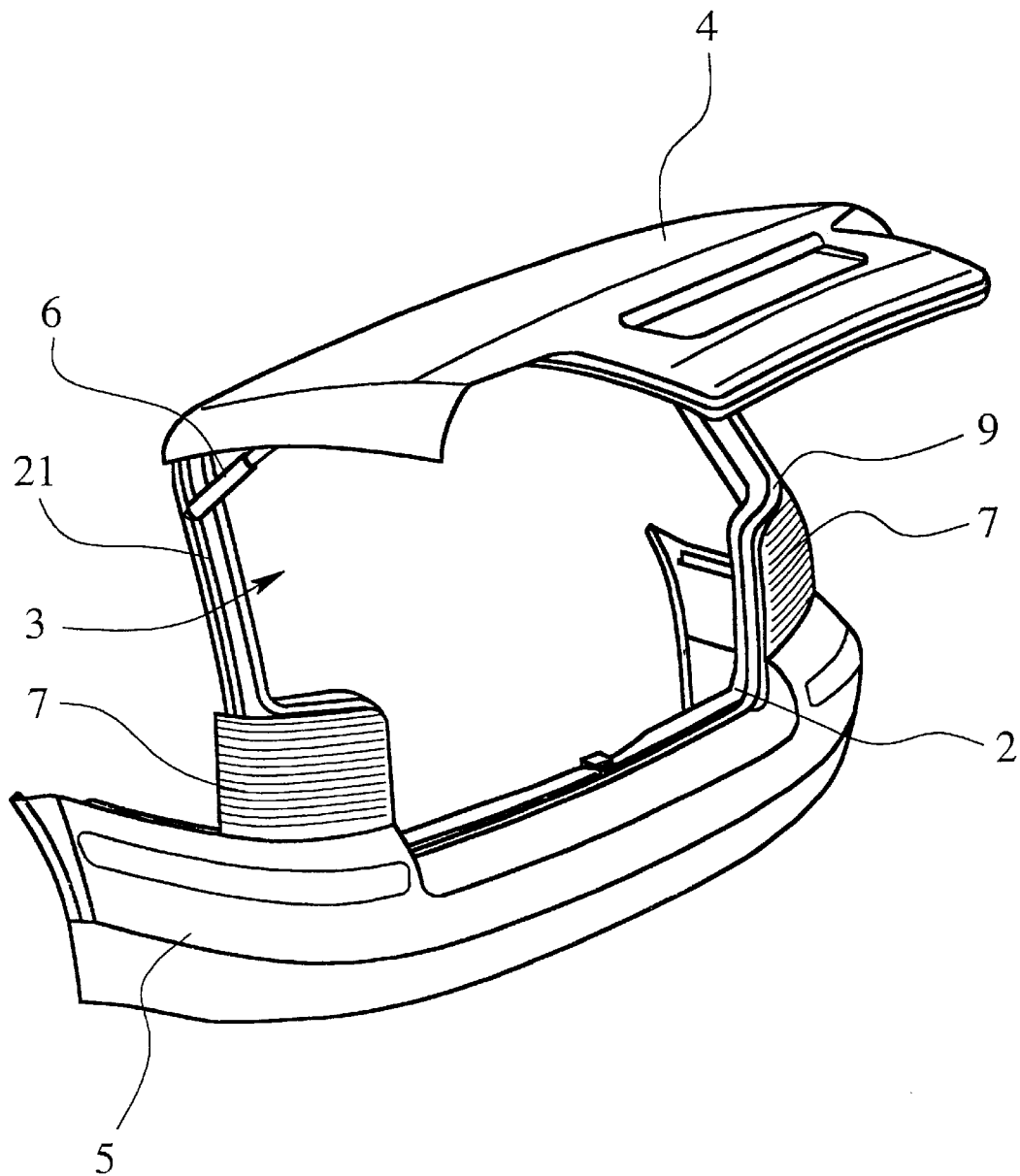
FIG. 1 is a perspective view showing one embodiment of a tailgate arrangement in the form of an independent tailgate module.
Figure 2:
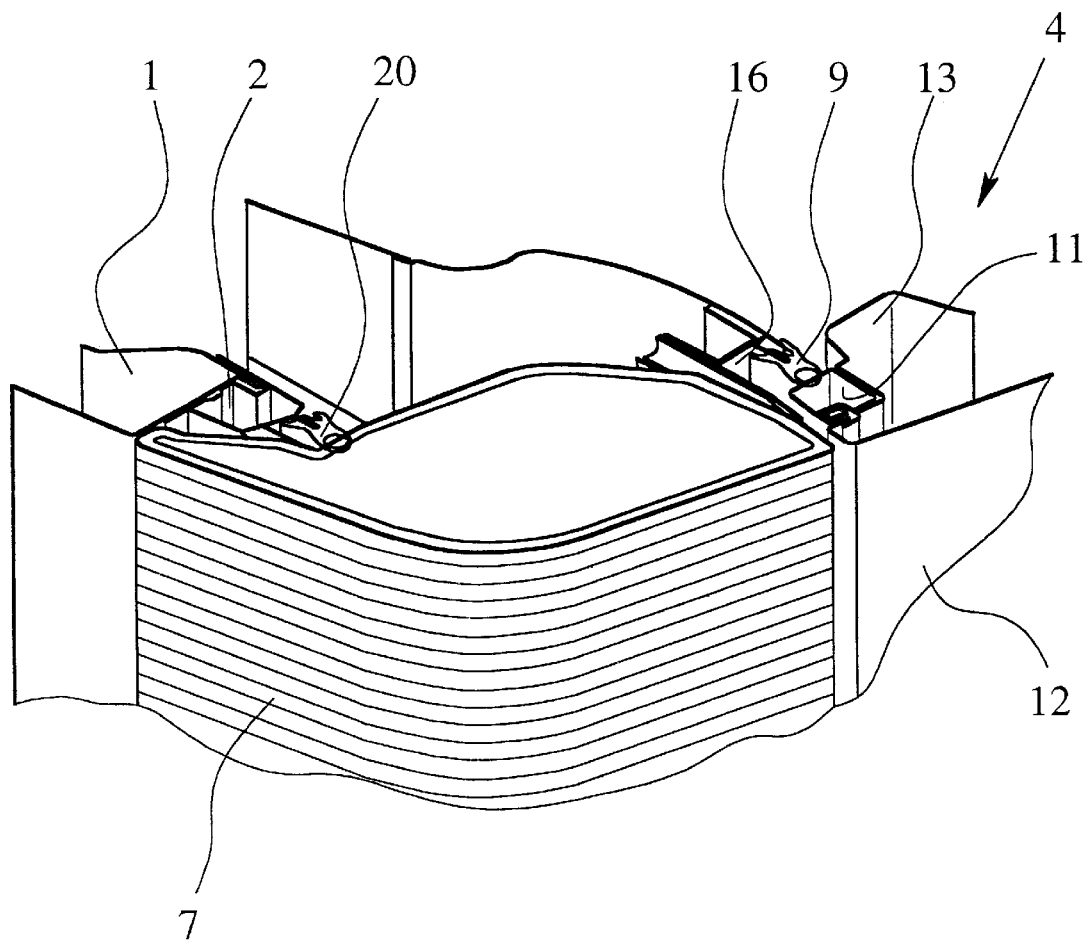
FIG. 2 is an enlarged representation of a section of the tailgate arrangement shown in FIG. 1, located on a body, horizontally at the height of the rear lamp unit on the left in FIG. 1.

FIG. 1 shows a tailgate arrangement which is made, in the preferred embodiment shown, as a tailgate module 3 which has its own peripheral retaining frame and which can be attached to the remaining body 1, shown in FIG. 2, in the manner known from the prior art explained initially. As has been explained above, this tailgate arrangement can also be part of the vehicle chassis in the quite classical manner.

The tailgate arrangement shown has a body opening 3 to which is assigned a tailgate 4 which closes it. The tailgate 4 is made, here, as a supported tailgate which therefore laterally surrounds the retaining frame 2 of the tailgate arrangement in the area of the rear window. Alternatively, this tailgate 4 can also be made as an enclosed tailgate between the lateral body parts. Underneath the body opening 3 is a shock absorbing bumper 5, and at the upper part of the tailgate 4, as is shown on the left, is a conventional gate holder 6, such as a telescopic strut.

At least one rear lamp unit 7 is located proximate the body opening 3, and in the embodiment shown, a rear lamp unit 7 is provided on each side of the body opening 3.

Figure 4:
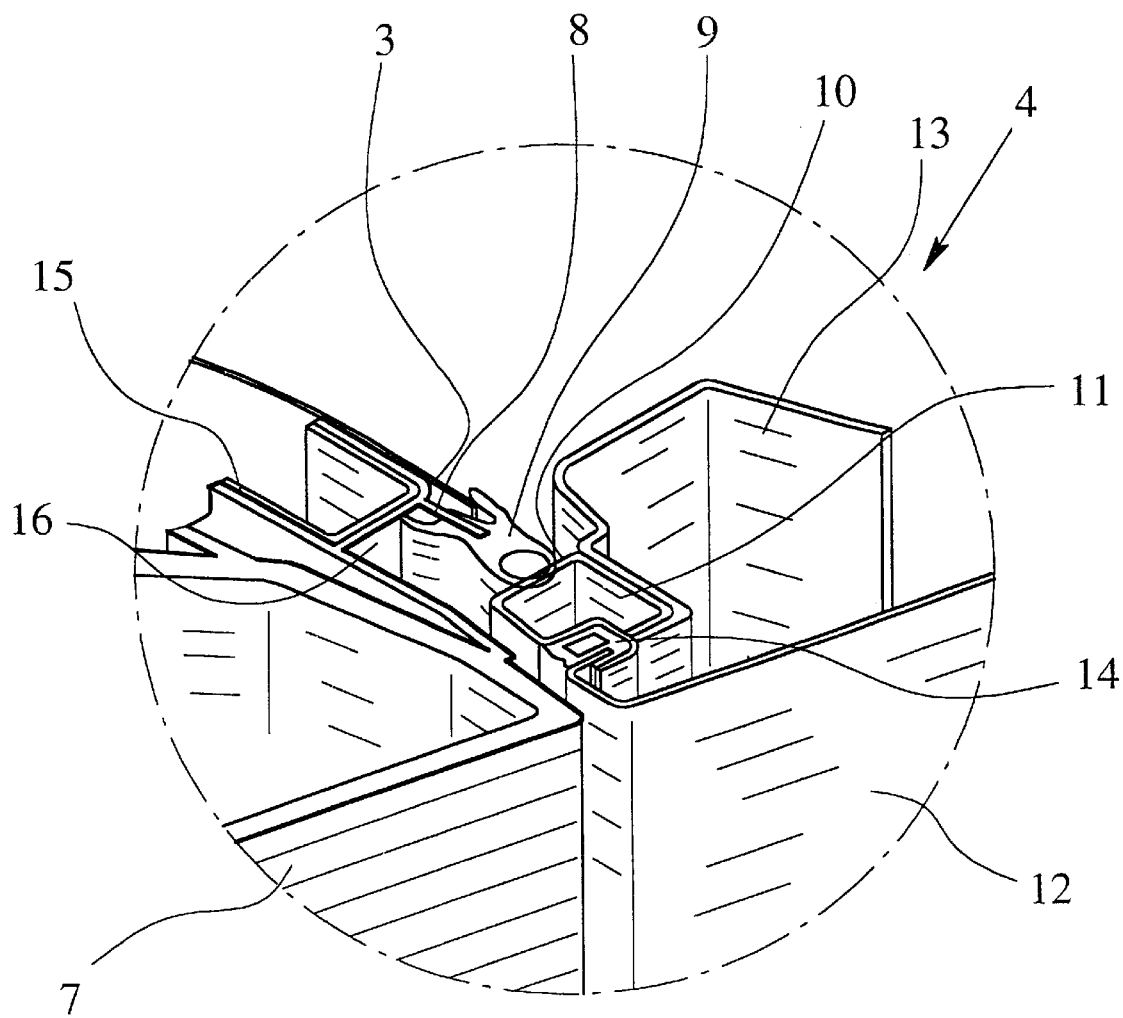
FIG. 4 shows the area of the tailgate seal enlarged from the section shown in FIG. 2.

Referring to FIG. 1 in conjunction with FIGS. 2 & 4, first, it is apparent that a peripheral attachment flange 8 is formed, on which a peripheral sealing profile 9 is disposed that is composed of one, or optionally, several sections. On the tailgate 4, a peripheral sealing flange 10 is provided that corresponds to the sealing profile 9. The exactly opposite assignment of, on the one hand, the attachment flange 8/sealing profile 9, and on the other, the sealing flange 10, has already been mentioned and will be simply noted here again as being equally suitable.

Furthermore, FIGS. 2 & 4 show that the tailgate 4 has a peripheral gate frame 11 which is jacketed on the outside with external lining 12 and on the inside with internal lining 13, and the external lining 12, in the embodiment shown here, is held via a supporting and retaining section 14 and can be pushed vertically onto the gate frame 11. The gate frame 11, on the inside, forms the aforementioned sealing flange 10 which adjoins the sealing profile 9 to seal it when the tailgate 4 is closed.

Figure 3:
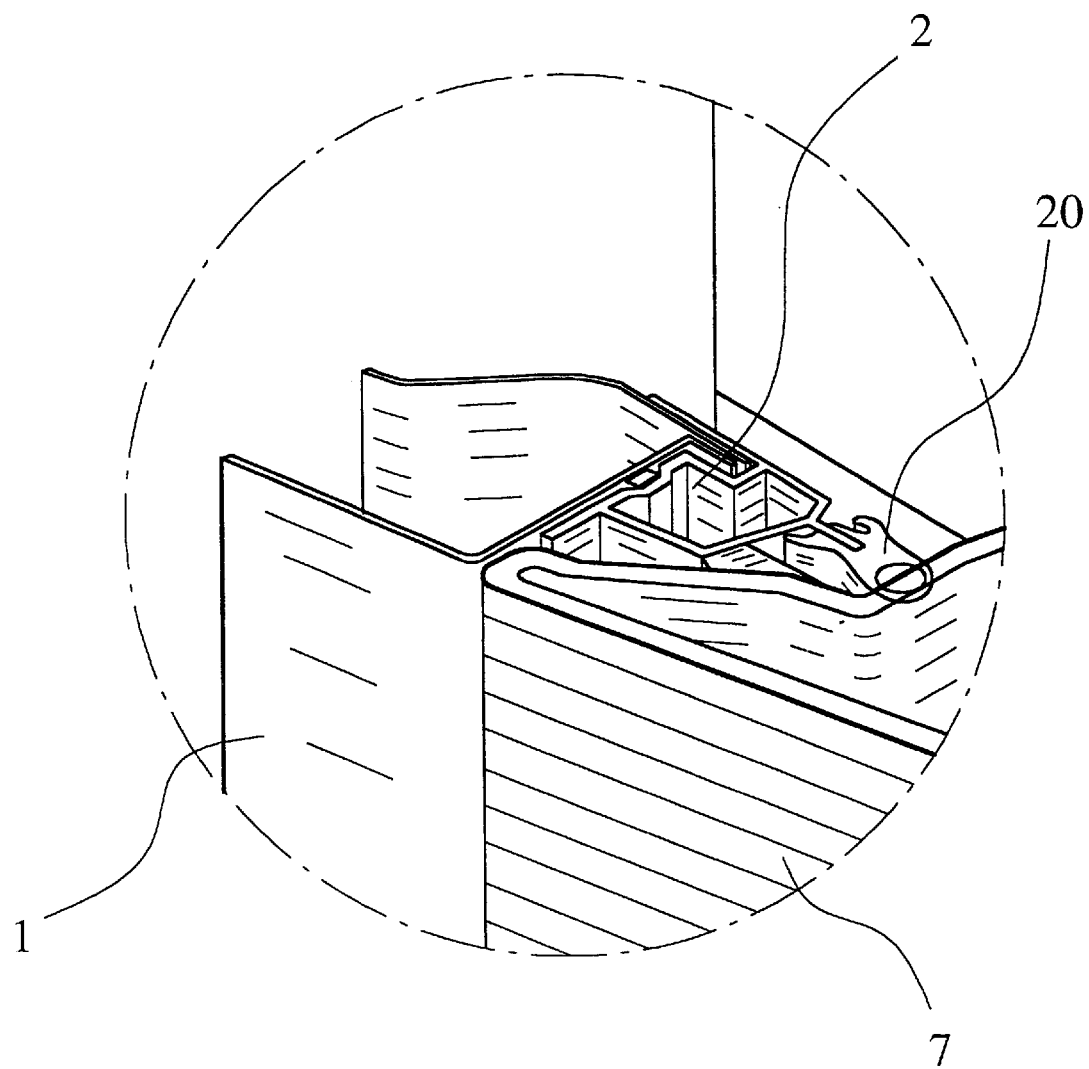
FIG. 3 shows the area of the body seal enlarged from the section shown in FIG. 2.

FIG. 3, in conjunction with FIG. 2, shows the location of the retaining frame 2 in the embodiment of a tailgate arrangement made as a tailgate module, this retaining frame 2 being securely Joined to the adjacent part of the body 1. In FIGS. 2–4, the outline of seals 9 & 20 is shown in the relaxed state so that the deformation which leads to the sealing action can be recognized.

As follows from FIGS. 1, 2 and 4 in concert, the edge of the body opening 3 is formed in the area of the rear lamp units 7 by the lamp units themselves, and the corresponding sections of the attachment flange 8 for the sealing profile 9 are formed on the rear lamp units 7. This has the advantages explained in the general part of the specification. In particular, the production of the retaining frame 2 or the corresponding areas of the body 1 is simplified, initial installation is simplified, and an additional seal for the rear lamp unit 7 in the area of the body opening is unnecessary.

In this embodiment and according to the preferred teaching, the attachment flange 8 is made as a shell-type profile. It is however also possible to make the attachment flange 8 as an adhesive surface, smooth or profiled accordingly, in which case the sealing profile 9 is not pushed on, but is cemented on instead.

The corresponding demands which must be considered in the selection of the material used are imposed on the rear lamp unit 7 which has now become a structure-forming component at the body opening 3. It is recommended that the rear lamp unit 7, at least in the area which forms the attachment flange 8, be made of a plastic material of relatively high strength. Here, it can be a fiber-reinforced and/or fiber-filled plastic material, especially a polyamide, for example, PA GF 30.

In the prior art, it has already been explained that the body 1 was equipped with metal reinforcing braces in the area of the rear lamp units 7. If the material selection for the rear lamp unit 7 does not ensure adequate loading capacity and stiffness in the area of the attachment flange 8, within the framework of the invention, the lamp unit 7 can be provided with a metal reinforcing brace 15 integrated therein in the area of the attachment flange 8, a part of the attachment flange 8, or elsewhere. In the embodiment shown in FIG. 2, the brace 15 provided for this purpose is in the form of a U-section that is open toward the inside, and is embedded in the plastic of the rear lamp unit 7, especially, injection molded with this plastic. Thus, the brace 15 is part of the rear lamp unit 7 provided as a component, and therefore, is not part of the body. However, it can also be provided that the metal reinforcing brace 15 be part of the body 1 which forms the body opening 3 or of the corresponding retaining frame 2, and accomplished roughly as in the prior art.

The teaching of this invention also make sense when the rear lamp unit 7 fits over the metal reinforcing strut 15 and forms the attachment flange 8. Then, the metal reinforcing strut 15 is relieved of its attachment function for the sealing profile 9 of the tailgate 4. At the same time, the displacement of the sealing profile 9 onto the attachment flange 8 on the rear lamp unit 7 obviates the necessity of the sealing function between the metal reinforcing strut 15 and rear lamp unit 7.

In principle, the metal reinforcing brace 15 can be located not only directly on the attachment flange 8, but can also be located elsewhere, so that the rear lamp unit 9 surrounds it in some way, for example, in the manner of a saddle. The metal reinforcing strut 15 is normally assigned, in this case, to the body I or the retaining frame 2, being attached thereto and used as reinforcement there.

Relative to the interior of the body I of the motor vehicle, outside of the seal track, there is generally a gutter on the body openings. In the preferred embodiment shown, it is now provided that a gutter 16 is formed on the rear lamp unit 7 in the area which forms the edge of the body opening 3. The gutter 16 has therefore been moved onto the rear lamp unit 7.

Figure 5:
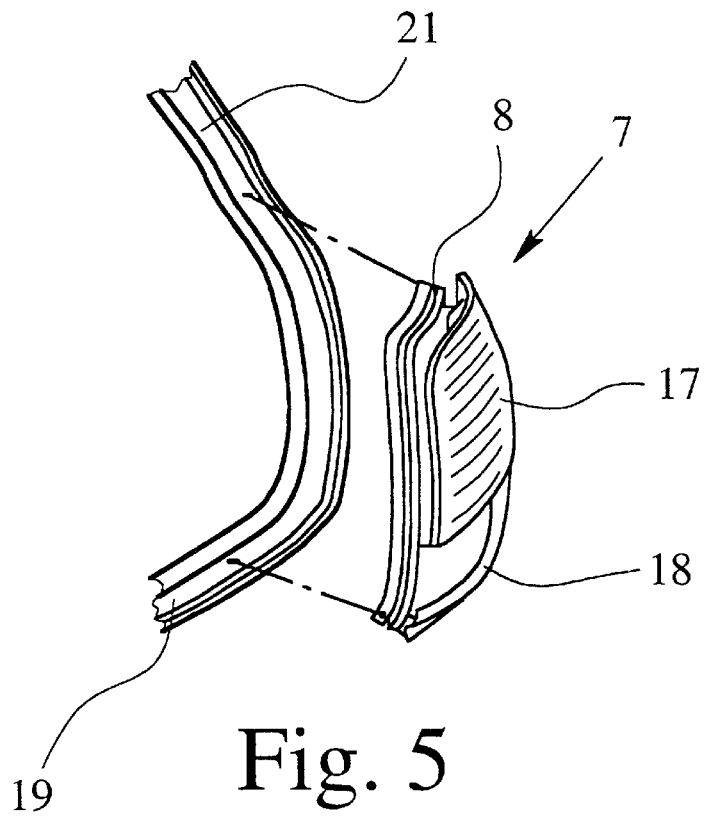
FIG. 5 shows a first example of an installation possibility of a rear lamp unit in accordance with the invention.
Figure 6:
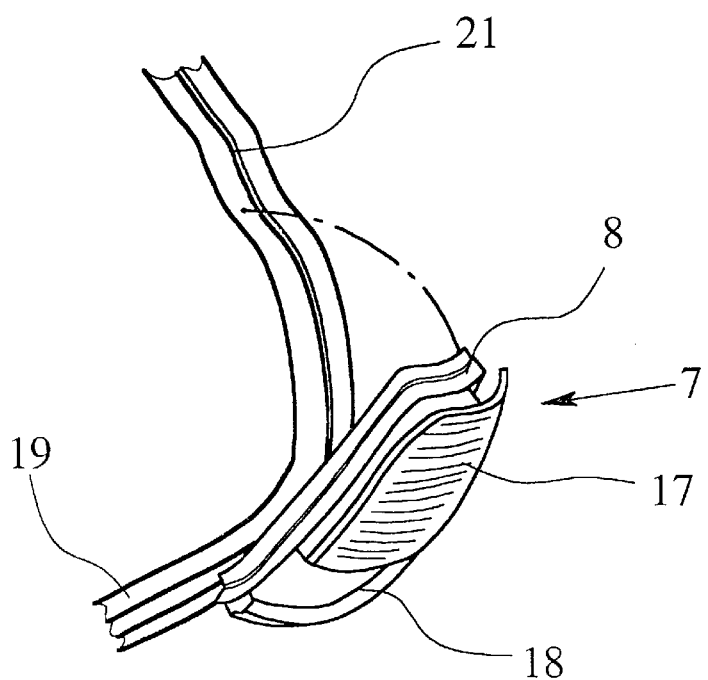
FIG. 6 shows a second example of an installation possibility of a rear lamp unit in accordance the invention.

The embodiment shown in FIGS. 5 and 6 illustrates, in comparison to FIG. 1, that there is a particular feature there. Specifically, it is provided that the rear lamp unit 7, on the lower edge underneath the reflector section 17, has a body connection section 18 which extends as far as the lower transverse flange 19 bordering the body opening. This configuration of rear lamp unit 7 eliminates the need for additional body parts which, in the past, had to be provided there, for example, behind the raised part of the shock absorber 5 shown in FIG. 1 (e.g., a receiver for a rear fog lamp, etc).

FIG. 2 in conjunction with FIG. 3 otherwise illustrates that, of course, rear lamp unit 7 itself must be sealed relative to the body 1 or the retaining frame 2. To do this, it is provided here that, in the remaining area of the rear lamp unit 7 which is not sealed by the sealing profile 9, on the edge of the body opening 3, another sealing profile 20 is located between the rear lamp unit 7 and the body 1. The embodiment shown in FIG. 1 provides this additional sealing profile 20 as an independent element between the rear lamp unit 7 and retaining frame 2. In this case, the additional sealing profile 20 is located on a corresponding attachment flange 8 on the retaining frame 2 (FIG. 3). Fundamentally, it would also be possible, even if more complex in term of installation technique, to integrate the other sealing profile 20 into the sealing profile 9 which runs peripherally entirely at the body opening 3, therefore, as is known, to provide a multitrack sealing profile 9 here in the area of the rear lamp units 7. The section of the sealing profile 9 which forms the other sealing profile 20 would then disappear in the area of the rear lamp unit 7 between the the lamp unit and the retaining frame 2 or body 1, while the remaining sealing profile 9 on the attachment flange 8 of the rear lamp unit 7 would continue to run as far as the lower transverse flange 19, where the two profiles would then again be together.

FIGS. 5 and 6 show examples of installation possibilities for the rear lamp unit 7 in a tailgate arrangement in accordance with the invention. While, in the embodiment of FIG. 5, attachment of the rear lamp unit 7 is produced in the classical manner with mounting screws (this can be done from the inside of the retaining frame 2), FIG. 6 shows the particular feature that there are form-fitting cavities assigned to one another on the lower transverse flange 19 of the body opening and on the rear lamp unit 7, the rear lamp unit 7 here can be inserted on the lower transverse flange 19 and the rear lamp unit 7 can otherwise be fixed on the side flange 21 of the body opening 3, especially can be engaged or screwed thereto.

As has been explained above, the rear lamp nit 7 itself, as a separate commercial part, is correspondingly the subject of this invention.

While various embodiments in accordance with the present invention have been shown and described, it is understood that the invention is not limited thereto, and is susceptible to numerous chances and modifications as known to those skilled in the art. Therefore, this invention is not limited to the details shown and described herein, and includes all such changes and modifications as are encompassed by the scope of the appended claims.

We claim:

1. Tailgate arrangement of a body of a motor vehicle, comprising a part defining a body opening, a tailgate for closing the body opening, at least one lamp unit proximate the body opening, a peripheral attachment flange bordering one of the body opening and tailgate, a peripheral sealing profile being mounted on the attachment flange, and a peripheral sealing flange bordering the other of the tailgate and body opening for sealing against the sealing profile in a position of the tailgate closing the body opening; wherein the least one lamp unit forms part of the edge of the body opening, a corresponding section of one of the attachment flange and sealing flange being provided on the lamp unit.

2. Tailgate arrangement as claimed in claim 1, wherein the attachment flange has a shell-shaped section.

3. Tailgate arrangement as claimed in claim 1, wherein the attachment flange has an adhesive surface.

4. Tailgate arrangement as claimed in claim 1, wherein a portion of the at least one lamp unit forms one of the attachment flange and the sealing flange; and wherein at least the portion of the lamp unit which forms said one of the attachment flange and the sealing flange is made of a high strength plastic.

5. Tailgate arrangement as claimed in claim 4 wherein the high strength plastic is formed of at least one of a fiber-reinforced and a fiber-filled plastic.

6. Tailgate arrangement as claimed in claim 4 wherein the high strength plastic is a polyamide.

7. Tailgate arrangement as claimed in claim 1, wherein a metal reinforcing stunt is integrated into said at least one lamp unit.

8. Tailgate arrangement as claimed in claim 7, wherein the metal reinforcing strut is proximate one of the attachment flange and the scaling flange.

9. Tailgate arrangement as claimed in claim 7, wherein at least a portion of the at least one lamp unit is made of plastic and the metal reinforcing strut is at least partially embedded in the plastic.

10. Tailgate arrangement as claimed in claim 1, wherein the part which forms the body opening has a metal reinforcing strut; and wherein the at least one lamp unit is fitted over the metal reinforcing strut and itself forms one of the attachment flange and the sealing flange.

11. Tailgate arrangement as claimed in claim 1, wherein a gutter is formed on the portion of the at least one lamp unit which forms part of the edge of the body opening.

12. Tailgate arrangement as claimed in claim 1, wherein the at least one lamp unit a lower edge underneath a reflector section; and wherein the lower edge has a body connection section which extends as far as a lower transverse flange of the body opening.

13. Tailgate arrangement as claimed in claim 1, wherein a second sealing profile is provided in an area of the rear lamp unit which is not sealed by the peripheral sealing profile, the second sealing profile being between the at least one lamp unit and an adjacent part of the body of the vehicle.

14. Tailgate arrangement as claimed in claim 13, wherein the second sealing profile is part of the peripheral sealing profile.

15. Tailgate arrangement as claimed in claim 1, wherein form-fitting cavities which conform to one another are provided on a lower transverse flange bordering the body opening and on the at least one lamp unit, the at least one lamp unit being inserted on the tower transverse flange with said form-fitting cavities interengaged with each other and with a side flange bordering the body opening being fixed to the at least one lamp unit.

16. Tailgate arrangement as claimed in claim 1, wherein the attachment flange is proximate the body opening and the sealing flange is on the tailgate, sections of the attachment flange being on the at least one lamp unit.

17. Tailgate arrangement as claimed in claim 1, wherein the tailgate arrangement is a tailgate module which has its own peripheral retaining frame which is attachable to a same of the body of the vehicle.

18. Tailgate arrangement as claimed in claim 1, wherein said at least one lamp unit comprise a pair of lamp units, each of which is at a respective side of the body opening.

19. Tailgate arrangement as claimed in claim 1, wherein the sealing flange is proximate the body opening and the attachment flange is on the tailgate, sections of the sealing flange being on the at least one lamp unit.

20. Tailgate arrangement as claimed in claim 1, wherein the tailgate is one of a rear door and a trunk lid of a vehicle.

21. Lamp unit for a tailgate arrangement of a body of a motor vehicle having a part defining a body opening, a tailgate for closing the body opening, at least one lamp unit proximate the body opening, a peripheral attachment flange bordering one of the body opening and tailgate, a peripheral sealing profile being mounted on the attachment flange, and a peripheral sealing flange bordering the other of the tailgate and body opening for sealing against the sealing profile in a position of the tailgate closing the body opening; wherein said lamp unit has a section of on of the attachment flange and the sealing flange formed thereon in an area which borders the body opening when the lamp is attached to the tailgate arrangement, in use.

* * * * *